United States Patent
Fujishima et al.

(10) Patent No.: US 9,645,759 B2
(45) Date of Patent: May 9, 2017

(54) APPARATUS AND METHOD FOR MONITORING COMMUNICATION

(71) Applicant: FUJITSU LIMITED, Kawasaki-shi, Kanagawa (JP)

(72) Inventors: Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 285 days.

(21) Appl. No.: 14/196,179

(22) Filed: Mar. 4, 2014

(65) Prior Publication Data
US 2014/0297699 A1  Oct. 2, 2014

(30) Foreign Application Priority Data

Mar. 27, 2013 (JP) .................. 2013-067242

(51) Int. Cl.
*G06F 17/30* (2006.01)
*G06F 3/06* (2006.01)

(52) U.S. Cl.
CPC ............ *G06F 3/0643* (2013.01); *G06F 3/061* (2013.01); *G06F 3/067* (2013.01); *G06F 3/0689* (2013.01)

(58) Field of Classification Search
CPC combination set(s) only.
See application file for complete search history.

(56) References Cited

U.S. PATENT DOCUMENTS

| 7,979,395 B1 * | 7/2011 | Aggarwal | G06F 17/30088 |
| | | | 707/649 |
| 2006/0271656 A1 | 11/2006 | Yagawa | |
| 2008/0208927 A1 * | 8/2008 | Chikusa | G06F 3/0605 |

FOREIGN PATENT DOCUMENTS

| JP | 2006-331392 | 12/2006 |
| JP | 2006-331458 | 12/2006 |

* cited by examiner

*Primary Examiner* — Shyue Jiunn Hwa
(74) *Attorney, Agent, or Firm* — Staas & Halsey LLP

(57) ABSTRACT

An apparatus acquires a packet transmitted according to a protocol employing block access, from a communication network, and determines which one of a system attribution block storing stores file system attribution data, a file attribution block storing file attribution data, and a file name block storing file name data the packet is related to. The apparatus calculates a block number of the file attribution block, based on addresses provided to the system and file attribution blocks, when the packet is determined to be related to the file attribution block. The apparatus calculates an identification number of each piece of the file attribution data, based on the system attribution data and the calculated block number, and associates file attribution data stored in the file attribution block with file name data stored in the file name block, based on the calculated identification numbers and identification numbers provided to the file name data.

9 Claims, 16 Drawing Sheets

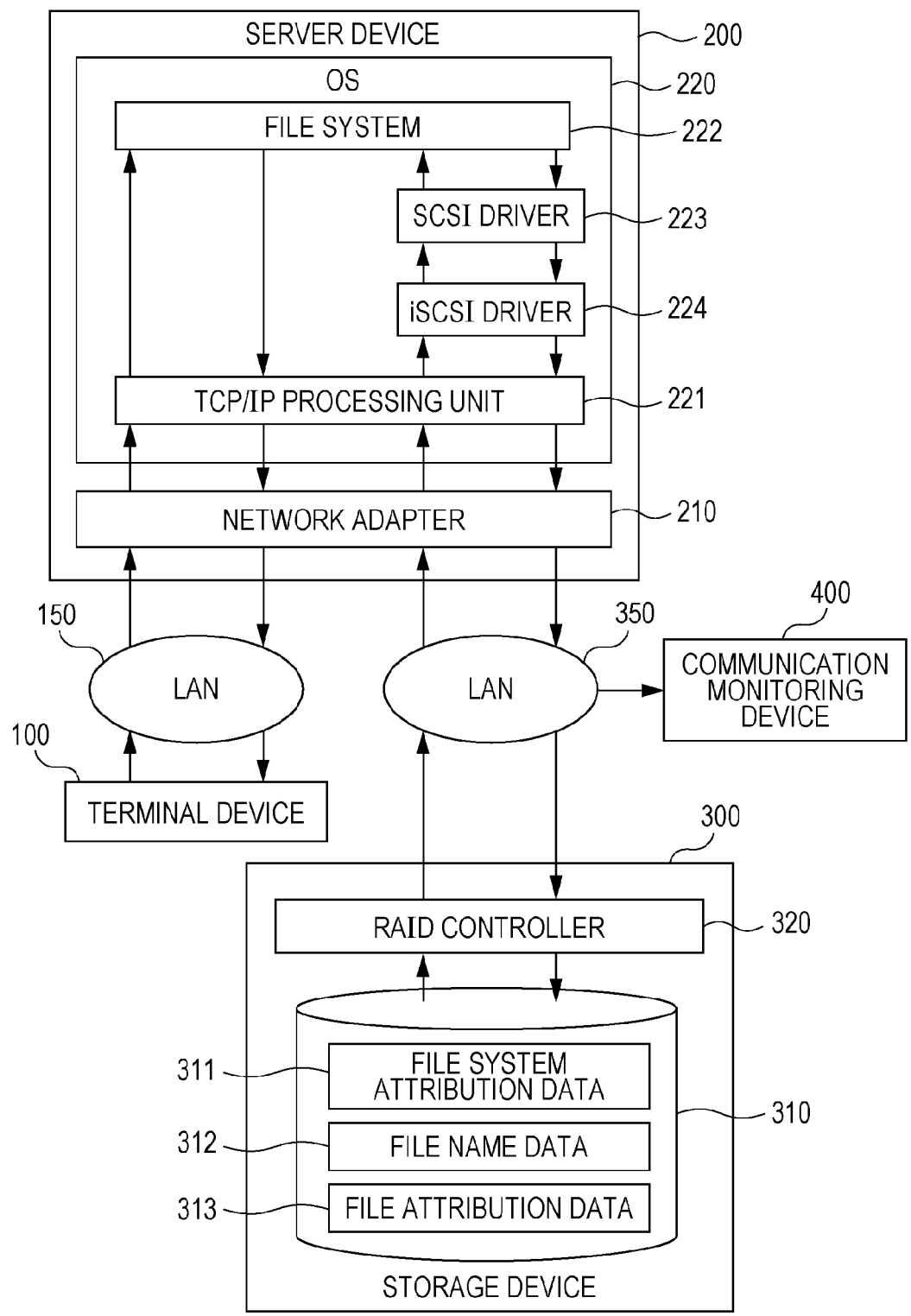

FIG. 2A

| TOTAL NUMBER OF BLOCKS | NUMBER OF BLOCKS/ GROUP | BLOCK SIZE | NUMBER OF ATTRIBUTIONS/ GROUP | NUMBER OF RESERVE GDT BLOCKS | ATTRIBUTION SIZE | ADDRESS |
|---|---|---|---|---|---|---|
| 35307520 | 32768 | 4096 | 32768 | 1015 | 128 | 8 |

FIG. 2B

| IDENTIFICATION NUMBER | FILE NAME | ADDRESS |
|---|---|---|
| 32769 | A0001/ | ****** |
| ... | ... | |
| 32801 | Z9999/ | |
| IDENTIFICATION NUMBER | FILE NAME | ****** |
| ... | ... | |
| IDENTIFICATION NUMBER | FILE NAME | ****** |
| 47851 | F0505 | |
| ... | ... | |
| 47883 | T5321/ | |

FIG. 3

| OWNER | SIZE | ACCESS TIME | MODIFY TIME | CHANGE TIME | MODE | ADDRESS |
|---|---|---|---|---|---|---|
| A | 382 | ********** | ********** | ********** | d | 270368 |
| ... | ... | ... | ... | ... | ... | |
| Z | 123 | ********** | ********** | ********** | – | |
| OWNER | SIZE | ACCESS TIME | MODIFY TIME | CHANGE TIME | MODE | ****** |
| ... | ... | ... | ... | ... | ... | |
| OWNER | SIZE | ACCESS TIME | MODIFY TIME | CHANGE TIME | MODE | |
| C | 256 | ********** | ********** | ********** | – | ****** |
| ... | ... | ... | ... | ... | ... | |
| D | 561 | ********** | ********** | ********** | d | |

MODE (FILE MODE)
d: DIRECTORY FILE
–: NORMAL FILE

FIG. 10A

| OWNER | SIZE | ACCESS TIME | MODIFY TIME | CHANGE TIME | MODE | ADDRESS | BLOCK NUMBER |
|---|---|---|---|---|---|---|---|
| A | 382 | ********** | ********** | ********** | d | 270368 | 33795 |
| ... | ... | ... | ... | ... | ... | | |
| Z | 123 | ********** | ********** | ********** | - | | |

FIG. 10B

| OWNER | SIZE | ACCESS TIME | MODIFY TIME | CHANGE TIME | MODE | ADDRESS | BLOCK NUMBER | IDENTIFICATION NUMBER |
|---|---|---|---|---|---|---|---|---|
| A | 382 | ********** | ********** | ********** | d | 270368 | 33795 | 32769 |
| ... | ... | ... | ... | ... | ... | | | ... |
| Z | 123 | ********** | ********** | ********** | - | | | 32801 |

FIG. 10C

| OWNER | SIZE | ACCESS TIME | MODIFY TIME | CHANGE TIME | MODE | IDENTIFICATION NUMBER |
|---|---|---|---|---|---|---|
| A | 382 | ********** | ********** | ********** | d | 32769 |
| ... | ... | ... | ... | ... | ... | ... |
| Z | 123 | ********** | ********** | ********** | - | 32801 |

⇕ ASSOCIATION

| IDENTIFICATION NUMBER | FILE TIME |
|---|---|
| 32769 | A0001/ |
| ... | ... |
| 32801 | Z9999 |

FIG. 11

| IDENTIFICATION NUMBER | FILE NAME | ACCESS TIME | MODIFY TIME | CHANGE TIME | SIZE |
|---|---|---|---|---|---|
| ... | ... | ... | ... | ... | ... |
| 47851 | T5321/F0505 | ********** | ********** | ********** | 256 |
| ... | ... | ... | ... | ... | ... |
| 38769 | H321/J0021 | ********** | ********** | ********** | 123 |
| ... | ... | ... | ... | ... | ... |
| 32801 | A0001/Z9999 | ********** | ********** | ********** | 123 |
| ... | ... | ... | ... | ... | ... |

FIG. 15A

| COMMAND NAME | ACCESS TIME |
|---|---|
| REFERENCE | &&&&&&&&& |
| UPDATE | ######### |

FIG. 15B

| FILE NAME | ACCESS TIME |
|---|---|
| T5321/F0505 | &&&&&&&&& |
| ... | ... |

FIG. 15C

| FILE NAME | ACCESS TIME | MODIFY TIME | CHANGE TIME | SIZE | UPDATE SOURCE FLAG | UPDATE DESTINATION FLAG |
|---|---|---|---|---|---|---|
| A0001/Z9999 | ######### | | | 123 | ON | |
| ... | ... | ... | ... | ... | ... | ... |
| H231/J0021 | ######### | | ######### | 123 | | ON |
| ... | ... | ... | ... | ... | ... | ... |

FIG. 16

| ACCESS TIME | COMMAND NAME | SOURCE FILE NAME | SOURCE IDENTIFICATION NUMBER | UPDATE DESTINATION FILE NAME | UPDATE DESTINATION IDENTIFICATION NUMBER |
|---|---|---|---|---|---|
| ######## | UPDATE | A0001/Z9999 | 32801 | H231/J0021 | 38769 |
| &&&&&&&&& | REFERENCE | T5321/F0505 | 47851 | ... | ... |
| ... | ... | ... | ... | ... | ... |

APPARATUS AND METHOD FOR MONITORING COMMUNICATION

CROSS-REFERENCE TO RELATED APPLICATION

This application is based upon and claims the benefit of priority of the prior Japanese Patent Application No. 2013-067242, filed on Mar. 27, 2013, the entire contents of which are incorporated herein by reference.

FIELD

The embodiment discussed herein is related to apparatus and method for monitoring communication.

BACKGROUND

An IP-storage area network (IP-SAN) in which an internet small computer system interface (iSCSI), a fibre channel (FC), or an internet protocol (IP) is employed as a communication protocol has been widely used (for example, refer to Japanese Laid-open Patent Publication No. 2006-331392 and Japanese Laid-open Patent Publication No. 2006-331458). When the IP-SAN is used between a server device and a storage device, a block flows at high speed between the devices. Here, a block is one aggregation obtained by storing a plurality of pieces of data. Thus, communication of a plurality of pieces of data in a block unit is called block access, for example.

In the block access described above, a file system is used. The file system is one of functions which are incorporated in an operating system (OS) and is implemented on a server device. When the file system receives a request of processing, such as reference and updating of data, from a terminal device which is connected to the server device, the file system calls a block in which the data is stored from the storage device and returns the block, in a form of block, to the storage device when processing on the data is completed.

SUMMARY

According to an aspect of the invention, an apparatus for monitoring communication is provided. The apparatus acquires a communication packet that is transmitted according to a protocol employing block access, from a communication network, and determines which one of a system attribution block, a file attribution block, and a file name block the communication packet is related to, where the system attribution block stores file system attribution data representing an attribution of a file system, the file attribution block stores plural pieces of file attribution data representing an attribution of a file, and the file name block stores a plurality of pieces of file name data representing a name of the file. The apparatus calculates a block number of the file attribution block, based on a first address that is provided to the system attribution block and a second address that is provided to the file attribution block, when the communication packet is determined to be related to the file attribution block. The apparatus further calculates an identification number of each piece of the file attribution data, based on the system attribution data and the calculated block number, and associates plural pieces of file attribution data that are stored in the file attribution block with plural pieces of file name data that are stored in the file name block, respectively, based on the calculated identification numbers and identification numbers that are provided to the plural pieces of file name data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically illustrates the configuration of a communication monitoring system, according to an embodiment;

FIG. 2A illustrates an example of the data configuration of file system attribution data, according to an embodiment;

FIG. 2B illustrates an example of the data configuration of file name data, according to an embodiment;

FIG. 3 illustrates an example of the data configuration of file attribution data, according to an embodiment;

FIG. 10A is a diagram illustrating an example of block number calculation, according to an embodiment;

FIG. 10B is a diagram illustrating an example of identification number calculation, according to an embodiment;

FIG. 10C is a diagram illustrating an example of association between file name data and file attribution data, according to an embodiment;

FIG. 11 is a diagram illustrating an example of configuration data which is stored in a configuration storage unit, according to an embodiment;

FIG. 15A illustrates an example of a command file, according to an embodiment;

FIG. 15B illustrates an example of a reference list, according to an embodiment;

FIG. 15C illustrates an example of an update list, according to an embodiment; and FIG. 16 illustrates an example of an access log which is stored in a log storage unit, according to an embodiment.

DESCRIPTION OF EMBODIMENTS

Figure 4:
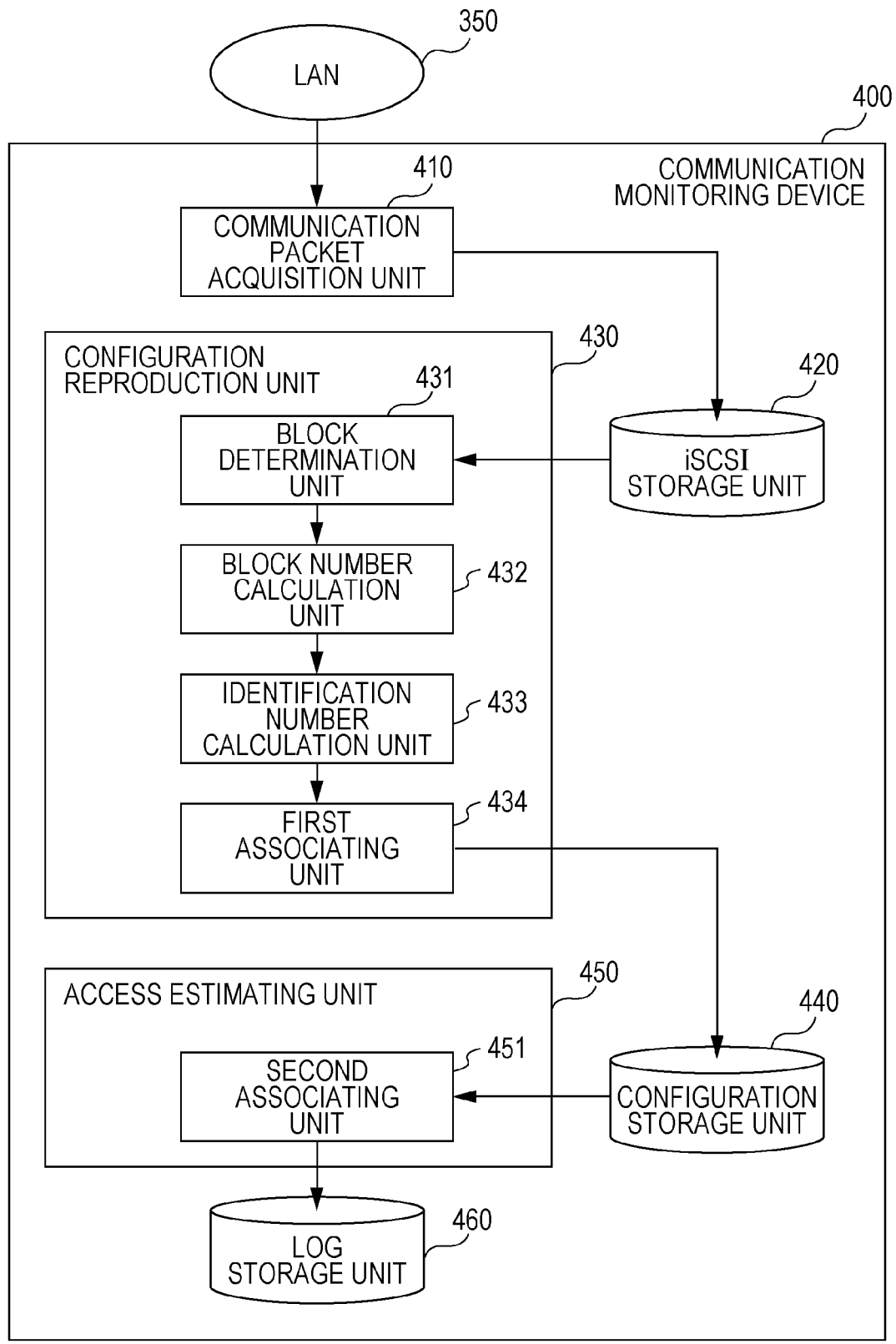
FIG. 4 illustrates an example of a block diagram of a communication monitoring device, according to an embodiment.

Here, there is a demand to monitor communication which is performed between the server device and the storage device described above to grasp an input/output relation of data. However, a plurality of pieces of data flow in a block unit between the server device and the storage device, so that it is difficult to grasp what type of processing is performed with respect to individual data only by acquiring and referring to the block.

Especially, a block in which a plurality of pieces of data related to a name of a file (for example, a normal file and a directory file) are stored and a block in which a plurality of pieces of data related to an attribution of the file (for example, access time) are stored do not necessarily flow together. Therefore, there is also a problem that it is difficult to reproduce the configuration of a directory file including a normal file as well, such as an access status with respect to the file and a hierarchical structure of the directory file.

An embodiment of the present disclosure is described below with reference to the accompanying drawings.

FIG. 1 schematically illustrates the configuration of a communication monitoring system S, according to an embodiment. As depicted in FIG. 1, the communication monitoring system S includes a terminal device 100, a server device 200, a storage device 300, and a communication monitoring device 400. The terminal device 100 and the server device 200 are connected with each other via a local area network (LAN) 150. The server device 200 and the storage device 300 are connected with each other via a LAN 350. Here, the server device 200 is also referred to as an initiator. The storage device 300 is also referred to as a target. The LAN 350 includes an IP network. The IP network includes a SAN based on an IP (IP-SAN). The terminal device 100 and the server device 200 may be connected with each other via the LAN 350.

The terminal device 100 includes an input device, a display device, and a control device which controls the input device and the display device. The terminal device 100 is connected to the LAN 150. The terminal device 100 is a personal computer (PC), for example. A user of the terminal device 100 may request access to a file from the server device 200 by designating a file name through the input device or the display device. When access to a file is requested, the control device transmits a TCP/IP packet (referred to below as a communication packet) in which the access request to a file and the designated file name are included to the server device 200.

The server device 200 includes a network adapter 210 and an OS 220. The network adapter 210 is a device for connecting the server device 200 to the LAN 150 and the LAN 350. When the network adapter 210 receives a communication packet which is transmitted from the terminal device 100, the network adapter 210 transmits the communication packet to a TCP/IP processing unit 221 which will be described later.

The OS 220 includes functions as the TCP/IP processing unit 221, a file system 222, a SCSI driver 223, and an iSCSI driver 224. Examples of the OS 220 include UNIX®, Linux®, and the like. The TCP/IP processing unit 221 performs protocol processing related to a TCP and protocol processing related to an IP. The TCP/IP processing unit 221 extracts an access request to a file and a designated file name from a communication packet transmitted from the network adapter 210, by performing protocol processing on the communication packet, and transmits the extracted request and the extracted file name to the file system 222.

The file system 222 converts the access request to a file which is transmitted from the TCP/IP processing unit 221, into an access request to a block. The file system 222 transmits the access request to a block and the designated file name to the SCSI driver 223. Here, the file system 222 may be a third extended file system (ext3) of a Linux type, for example.

When the SCSI deriver 223 receives the access request to a block, the SCSI driver 223 issues a SCSI read command. The SCSI driver 223 transmits the SCSI read command and the designated file name to the iSCSI driver 224. When the iSCSI driver 224 receives the SCSI read command and the designated file name, the iSCSI driver 224 encapsulates the SCSI read command and the designated file name separately. The encapsulated SCSI read command is also referred to as a SCSI command packet, for example. The encapsulated file name is also referred to as a SCSI data-out packet, for example. The iSCSI driver 224 transmits the SCSI command packet and the SCSI data-out packet to the TCP/IP processing unit 221.

The TCP/IP processing unit 221 generates a communication packet including the SCSI command packet and a communication packet including the SCSI data-out packet. These communication packets are transmitted to the storage device 300 via the network adapter 210 and the LAN 350. Here, the communication packet including the SCSI command packet is first transmitted, then a predetermined communication packet (for example, ready to transfer) promoting data transmission is transmitted, and the communication packet including the SCSI data-out packet is subsequently transmitted.

The storage device 300 includes a hard disk drive (HDD) 310 and a redundant arrays of inexpensive disks (RAID) controller 320. The HDD 310 stores file system attribution data 311, file name data 312, and file attribution data 313. The file system attribution data 311, the file name data 312, and the file attribution data 313 are each stored in a block unit. Details of the file system attribution data 311, the file name data 312, and the file attribution data 313 will be described later.

The RAID controller 320 includes the above-mentioned various types of protocols. Upon receiving a communication packet from the server device 200, the RAID controller 320 extracts a SCSI read command and a designated file name from the communication packet by performing protocol processing on the communication packet. Then, the RAID controller 320 extracts a block which includes the designated file name, from the file name data 312 which is stored in the HDD 310, on the basis of the file name. The RAID controller 320 encapsulates the extracted block. The encapsulated block is also referred to as a SCSI data-in packet, for example. The RAID controller 320 generates a communication packet including the SCSI data-in packet and transmits the communication packet to the server device 200.

When the communication packet reaches the server device 200 from the storage device 300, the TCP/IP processing unit 221, the SCSI driver 223, and the iSCSI driver 224 perform various types of protocol processing so as to extract the block which is the content of the communication packet. Subsequently, the file system 222 acquires a block including the file system attribution data 321 by a similar communication method on the basis of an identification number (which will be described in detail later) which is provided to the block. When the file system 222 acquires the block including the file system attribution data 321, the file system 222 acquires a block including the file attribution data 323 on the basis of an address (which will be described in detail later) provided to the block.

Thus, as a result of communication based on a protocol which employs the block access including iSCSI, a communication packet which includes various types of blocks, a communication packet which does not include various types of blocks (for example, a communication packet which includes a designated file name and a designated identification number), and the above-described predetermined communication packet which promotes data transmission separately flow in the LAN 350. In addition to these communication packets, a wide variety of communication packets flow in the LAN 350. The communication monitoring device 400 monitors these communication packets which flow in the LAN 350. The communication monitoring device 400 acquires the communication packets and analyzes these communication packets. The communication monitoring device 400 will be described in detail later.

Subsequently, the data configurations of the file system attribution data 311, the file name data 312, and the file attribution data 313 which are mentioned above are described.

FIG. 2A illustrates an example of the data configuration of the file system attribution data 311, according to an embodiment. FIG. 2B illustrates an example of the data configuration of the file name data 312, according to an embodiment. FIG. 3 illustrates an example of the data configuration of the file attribution data 313, according to an embodiment. The file system attribution data 311 includes the total number of blocks, the number of blocks/group, a block size, the number of attributions/group, the number of reserve GDT blocks, and an attribution size, as a data format, as illustrated in FIG. 2A. The total number of blocks represents the total number of blocks which are dealt with by the file system 222. The number of blocks/group represents the number of blocks per block group. The block size represents a size (bytes) of one block. The number of attributions/group represents the number of attributions per block group. The number of reserve GDT blocks represents the number of blocks which are reserved for expansion. The attribution size represents a size (bytes) of one attribution. The file system attribution data 311 is one block in this embodiment and an address "8" is provided to this block. The file system attribution data 311 is also referred to as a super block, for example. The attribution size is also referred to as an inode size, for example.

The file name data 312 includes an identification number and a file name as a data format, as illustrated in FIG. 2B. The file name data 312 includes a pointer to a parent directory file as well. The file name is a name of a file which is provided by a user or a server device. Examples of the file name include a file name representing a directory file (for example, "A0001/") and a file name representing a normal file (for example, "Z9999"). The identification number is a unique number which is used by the file system 222 to identify a directory file or a normal file. The identification number is provided for every file name. The file name data 312 includes several blocks and addresses are respectively provided to the blocks. When the file name is a file name representing a directory, the file name data 312 includes a list with identification numbers of files (normal file, directory file) which are directly below the file name data 312 as well. The list with identification numbers enables grasp of a hierarchical structure between a first directory file and a second directory file which is directly below the first directory file and a hierarchical structure between a directory file and a normal file which is directly below the directory file. Here, the file name data 312 is also referred to as a directory entry or a dentry, for example. The identification number is also referred to as an inode number, for example.

The file attribution data 313 includes an owner, a size, access time, modify time, change time, and a mode (file mode) as a data format, as illustrated in FIG. 3. Delete time may be included in the file attribution data 313 as appropriate. The owner represents an owner of a file. The size represents a size (bytes) of a file. The access time represents time at which the file is last referred (accessed). The modify time represents time at which the file is last updated. The change time represents time at which the file or an attribution of the file is last altered. When the file is updated, both of the modify time and the change time vary. Here, the access time, the modify time, and the change time are respectively denoted by symbols in this embodiment, but the time may be denoted in a time format such as hh:mm:ss:ms.

The mode represents a file mode of the file. A mode "d" represents that the file is a directory file. A mode "-" represents that the file is a normal file. The file attribution data 313 includes several blocks and an address (for example, an address "270368") is provided to each of the blocks. Here, the file attribution data 313 is exhibited in an identification number order, but an identification number is not included in the file attribution data 313. Therefore, it is difficult to directly associate the file name data 312 including an identification number with the file attribution data 313 including no identification number. Here, the file attribution data 313 is also referred to as an inode, for example.

Next, the communication monitoring device 400 mentioned above is described with reference to FIG. 4.

FIG. 4 is an example of a block diagram of the communication monitoring device 400, according to an embodiment. The communication monitoring device 400 includes a communication packet acquisition unit 410, an iSCSI storage unit 420, a configuration reproduction unit 430, a configuration storage unit 440, an access estimating unit 450, and a log storage unit 460.

The communication packet acquisition unit 410 acquires (captures) a communication packet from the LAN 350. When the acquired communication packet is a communication packet which is communicated by the iSCSI, the communication packet acquisition unit 410 stores a block, a designated file name, and an identification number or an address which are contents of the communication packet (hereinafter, referred to as a block and so forth) in the iSCSI storage unit 420. Here, examples of a protocol related to the block access include not only the above-described iSCSI but also a fibre channel over IP (FCIP) and an internet fibre channel protocol (iFCP). When the acquired communication packet is a communication packet for which the iSCSI is not used, the communication packet acquisition unit 410 discards the acquired communication packet.

The configuration reproduction unit 430 analyzes a block stored in the iSCSI storage unit 420 so as to reproduce the configuration of a directory file which includes a normal file as well. The configuration reproduction unit 430 includes a block determination unit 431, a block number calculation unit 432, an identification number calculation unit 433, and a first associating unit 434.

The block determination unit 431 determines whether a block and so forth which are stored in the iSCSI storage unit 420 are related to a predetermined block. That is, the block determination unit 431 determines whether the block and so forth are related to one of a system attribution block, a file attribution block, and a file name block. The system attribution block is a block in which the system attribution data 311 representing an attribution of a file system is stored. The file attribution block is a block in which a plurality of pieces of file attribution data 313 representing an attribution of a file are stored. The file name block is a block in which a plurality of pieces of file name data 312 representing a name of a file are stored. Determination of whether the block and so forth are related to one of the system attribution block, the file attribution block, and the file name block is performed on the basis of a data format. For example, when several bits from the head of a block and so forth which are acquired represent the total number of blocks, it is determined that the block and so forth are related to the system attribution block. In a similar manner, when several bits from the head represent an identification number and a file name, it is determined that the block and so forth are related to the file name block. When several bits from the head represent an owner, it is determined that the block and so forth are related to the file attribution block. On the other hand, when several bits from the head of a block and so forth which are acquired represent a file name, it is not determined that the block and so forth are related to a predetermined block. Further, when several bits from the head represent an identification number but do not represent a file name, it is not determined that the block and so forth are related to a predetermined block.

When the block determination unit 431 determines that the block and so forth are related to the file attribution block, the block number calculation unit 432 calculates a block number of the file attribution block on the basis of an address provided to the system attribution block and an address provided to the file attribution block. A calculation formula of a block number is expressed below. Here, int which is used in the calculation formula of a block number represents a function for truncating decimal places.

(Calculation Formula of Block Number)

Block number=int(("address provided to file attribution block"−"address provided to system attribution block")×512÷"block size")

Here, when calculation is performed by using the address "8" which is provided to the system attribution block and is illustrated in FIG. 2A described above, a block size "4096" which is illustrated in FIG. 2A, and an address "270368" which is provided to the file attribution block and is illustrated in FIG. 3, a block number "33795" is obtained. That is, it is understood that the block number "33795" is provided to the file attribution block.

The identification number calculation unit 433 calculates each identification number of the file attribution data on the basis of the file system attribution data 311 and the block number which is calculated by the block number calculation unit 432. The identification number calculation unit 433 first calculates an identification number of the head. A calculation formula of an identification number of the head is expressed below. Here, int which is used in the calculation formula of an identification number of the head and a calculation formula of the number of attributions/block represents a function for truncating decimal places.

(Calculation Formula of Identification Number of Head)

Calculation formula of identification number of head="number of attributions/group"×int("block number"÷"number of blocks/group")+("block number"−("number of blocks/group"×int("block number"÷"number of blocks/group")+"offset up to head"−1)−1)×"number of attributions/block"+1

(Calculation Formula of Number of Attributions/Block)

Number of attributions/block=int("block size"÷"attribution size")

Here, the above-mentioned "offset up to head" varies depending on a calculation result obtained by a predetermined calculation formula. The predetermined calculation formula is first expressed below. Here, int which is used in the predetermined calculation formula represents a function for truncating decimal places.

(Predetermined Calculation Formula)

Calculation result=int("block number"÷"number of blocks/group")

When a calculation result is "0", "1", or a power of "3", "5", and "7", the following calculation formula of an offset up to the head is used. Here, int which is used in the calculation formula of an offset up to the head represents a function for rounding up decimal places.

(Calculation Formula of Offset Up to Head)

Offset up to head=3+"number of reserve GDT blocks"+int(int("total number of blocks"÷"number of blocks/group")×32÷"block size")

On the other hand, when a calculation result is other than "0", "1", or a power of "3", "5", and "7", a numerical value "2" is an offset up to the head.

Here, when the predetermined calculation formula is calculated by using the block number "33795" which is calculated by the block number calculation unit 432 and the number of blocks/group "32768" illustrated in FIG. 2A described above, a calculation result "1" is obtained. Accordingly, the above-mentioned calculation formula of an offset up to the head is used. Further, when the calculation formula of an offset up to the head is calculated by using the number of reserve GDT blocks "1015", the total number of blocks "35307520", the number of blocks/group "32768", and the block size "4096" which are illustrated in FIG. 2A, an offset up to the head "1026" is obtained.

Accordingly, when the calculation formula of the number of attributions/block is calculated by using the block size "4096" and an attribution size "128", the number of attributions/block "32" is obtained. Further, the calculation formula of an identification number of the head is calculated by using the offset up to the head "1026", the block number "33795" which is calculated by the block number calculation unit 432, the number of attributions/group "32768" which is illustrated in FIG. 2A, the number of blocks/group "32768" which is illustrated in FIG. 2A, and the number of attributions/block "32", an identification number of the head "32769" is obtained. Consequently, "32770" which is obtained by adding "1" to the identification number of the head is obtained as the second identification number. When similar calculation is performed thereafter, the last identification number is obtained by adding the number of attributions/block "32" to the identification number of the head "32769". That is, the last identification number "32801" is obtained.

The first associating unit 434 associates plural pieces of file attribution data 313 which are stored in the file attribution block with plural pieces of file name data 312 which are stored in the file name block respectively, on the basis of respective identification numbers which are calculated by the identification number calculation unit 433 and identification numbers which are respectively provided to the pieces of file name data 312. Further, the first associating unit 434 associates directory files with each other and associates a directory file with a normal file, on the basis of a list with identification numbers which are stored in a directory file. Consequently, the configuration of a directory file which includes a normal file as well is reproduced. The first associating unit 434 stores the file name data 312 and the file attribution data 313 which are associated with each other in the configuration storage unit 440 as configuration data.

The access estimating unit 450 analyzes configuration data which is stored in the configuration storage unit 440 so as to estimate a state of access with respect to the configuration data. The access estimating unit 450 includes a second associating unit 451. The second associating unit 451 associates the configuration data with a command file on the basis of each time stamp of the configuration data and the command file which has caused the file name data 312 to flow to the LAN 350. Further, the second associating unit 451 associates files which are objects of the command file with each other on the basis of respective file sizes. The time stamp includes at least one of a time stamp related to access time, a time stamp related to modify time, and a time stamp related to change time. The second associating unit 451 stores the associated result in the log storage unit 460.

Here, the hardware configuration of the communication monitoring device 400 is described with reference to FIG. 5.

Figure 5:
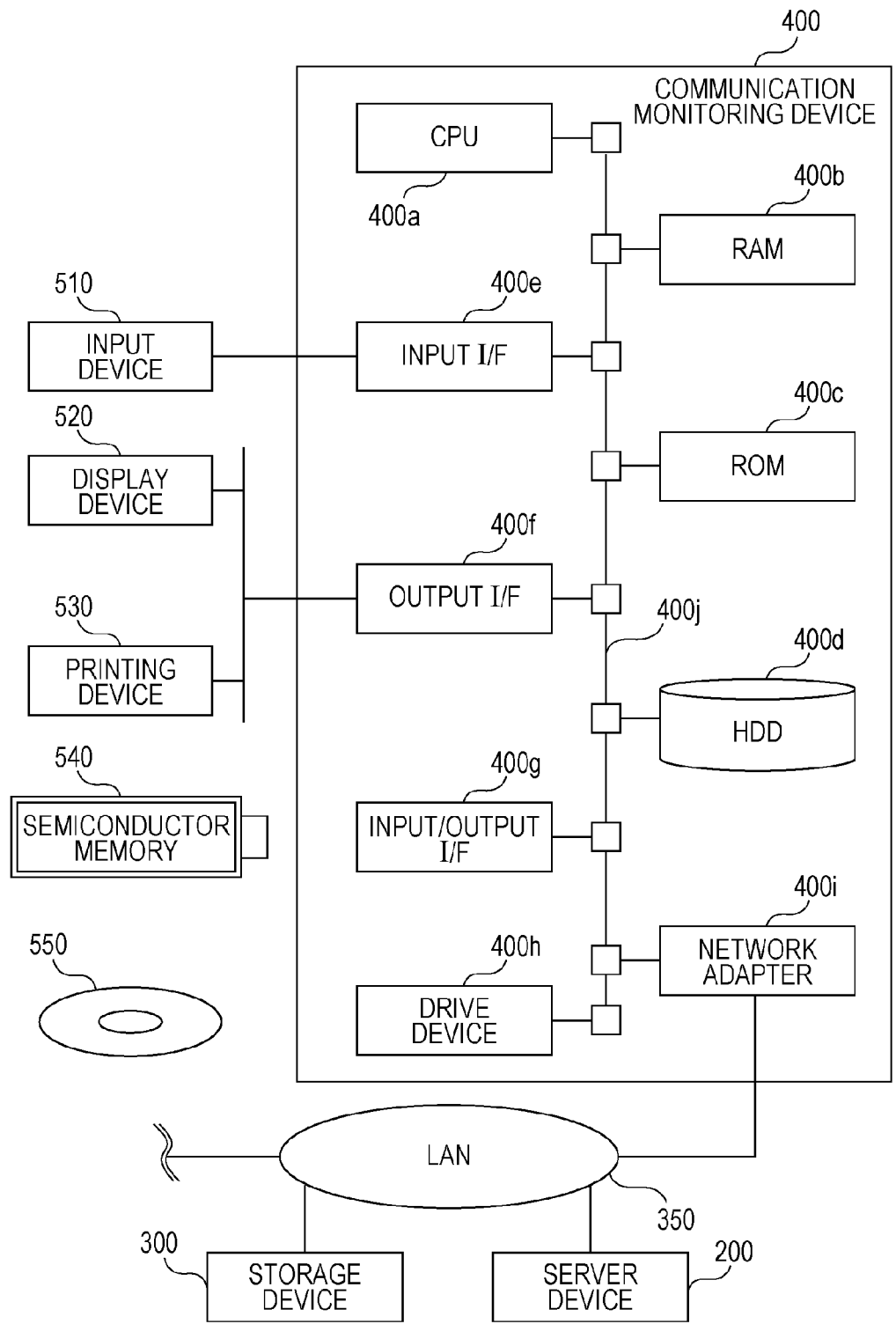
FIG. 5 illustrates an example of the hardware configuration of the communication monitoring device, according to an embodiment.

FIG. 5 illustrates an example of the hardware configuration of the communication monitoring device 400, according to an embodiment. The communication monitoring device 400 includes a central processing unit (CPU) 400*a*, a random access memory (RAM) 400*b*, a read only memory (ROM) 400*c*, and a hard disc drive (HDD) 400*d*. The communication monitoring device 400 further includes an input interface (I/F) 400*e*, an output I/F 400*f*, and an input/output I/F 400*g*. The communication monitoring device 400 includes a drive device 400*h* and a network adapter 400*i* as well. These devices 400*a* to 400*i* are mutually connected via a bus 400*j*. When at least the CPU 400*a* and the RAM 400*b* cooperate with each other, a computer is realized.

To the input I/F 400*e*, an input device 510 is connected. Examples of the input device include a keyboard and a mouse. To the output I/F 400*f*, an output device is connected. Examples of the output device include a display device 520 (for example, a liquid crystal display) and a printing device 530 (for example, a printer). To the input/output I/F 400*g*, a semiconductor memory 540 is connected. Examples of the semiconductor memory 540 include a universal serial bus (USB) memory and a flash memory. The input/output I/F 400*g* reads a program and data which are stored in the semiconductor memory 540. The input I/F 400*e*, the output I/F 400*f*, and the input/output I/F 400*g* include a USB port, for example.

To the drive device 400*h*, a portable recording medium 550 is inserted. As the portable recording medium 550, a removable disc such as a compact disc (CD)-ROM or a digital versatile disc (DVD) is used. The drive device 400*h* reads in a program and data which are stored in the portable recording medium 550. To the network adapter 400*i*, one end of a network cable is connected, for example. The other end of the network cable is connected with the server device 200 and the storage device 300.

The RAM 400*b* mentioned above reads in a communication monitoring program which is stored in the ROM 400*c*, the HDD 400*d*, or the semiconductor memory 540. The RAM 400*b* reads in a communication monitoring program which is recorded in the portable recording medium 550. The CPU 400*a* executes the communication monitoring program, which is read in, so as to realize each of the functions 410, 430, 431, . . . , and 451 of the communication monitoring device 400 other than the storage units 420, 440, and 460. Further, respective processing operations of the communication monitoring method are also executed by the communication monitoring device 400. It is sufficient that the communication monitoring program corresponds to a flowchart which will be described later. The hardware configurations of the server device 200 and the storage device 300 are basically the same as the hardware configuration of the communication monitoring device 400.

The communication monitoring method which is executed in the communication monitoring device 400 is now described.

Figure 6:
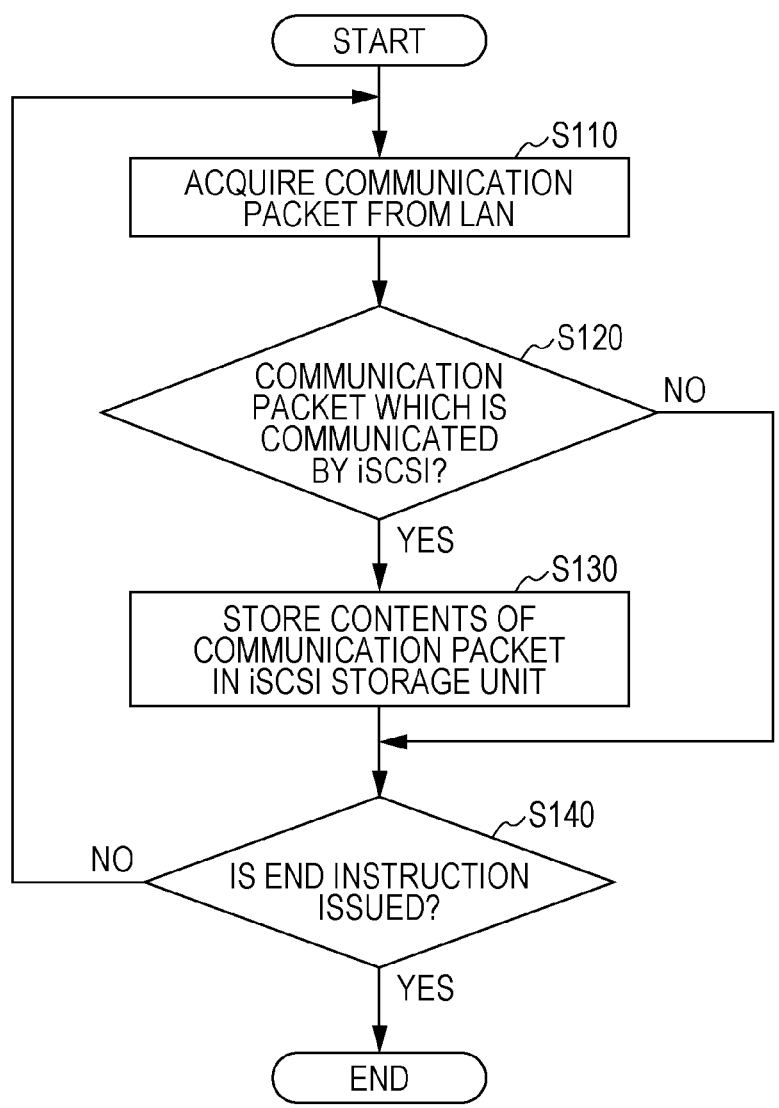
FIG. 6 is a diagram illustrating an example of an operational flowchart for a communication packet acquisition unit, according to an embodiment.

FIG. 6 is a diagram illustrating an example of an operational flowchart for the communication packet acquisition unit 410, according to an embodiment. The communication packet acquisition unit 410 first acquires a communication packet from the LAN 350 (step S110). The communication packet acquisition unit 410 determines whether or not the communication packet which is acquired in step S110 is a communication packet which is communicated by the iSCSI (step S120). This determination is performed on the basis of whether or not a packet related to the iSCSI is extracted when protocol processing related to the TCP/IP is performed with respect to the acquired communication packet, for example. For example, when a SCSI command packet, a SCSI data-out packet, a SCSI data-in packet, and the like are extracted, the acquired communication packet is determined as a communication packet for which the iSCSI is used. Here, the determination may be performed by using an IP address and a port number.

When the communication packet acquisition unit 410 determines that the acquired communication packet is a communication packet which is communicated by the iSCSI (step S120: YES), the communication packet acquisition unit 410 stores contents of the acquired communication packet in the iSCSI storage unit 420 (step S130). More specifically, a block and so forth, which are extracted by performing the protocol processing related to the TCP/IP with respect to the acquired communication packet, are stored in the iSCSI storage unit 420. When the communication packet acquisition unit 410 determines that the acquired communication packet is not a communication packet which is communicated by the iSCSI (step S120: NO), the communication packet acquisition unit 410 does not perform the processing of step S130. Therefore, only contents (block and so forth) of a communication packet which is communicated by the iSCSI are stored in the iSCSI storage unit 420. The communication packet acquisition unit 410 performs the processing from step S110 to S130 until an end instruction is issued (step S140).

Figure 7:
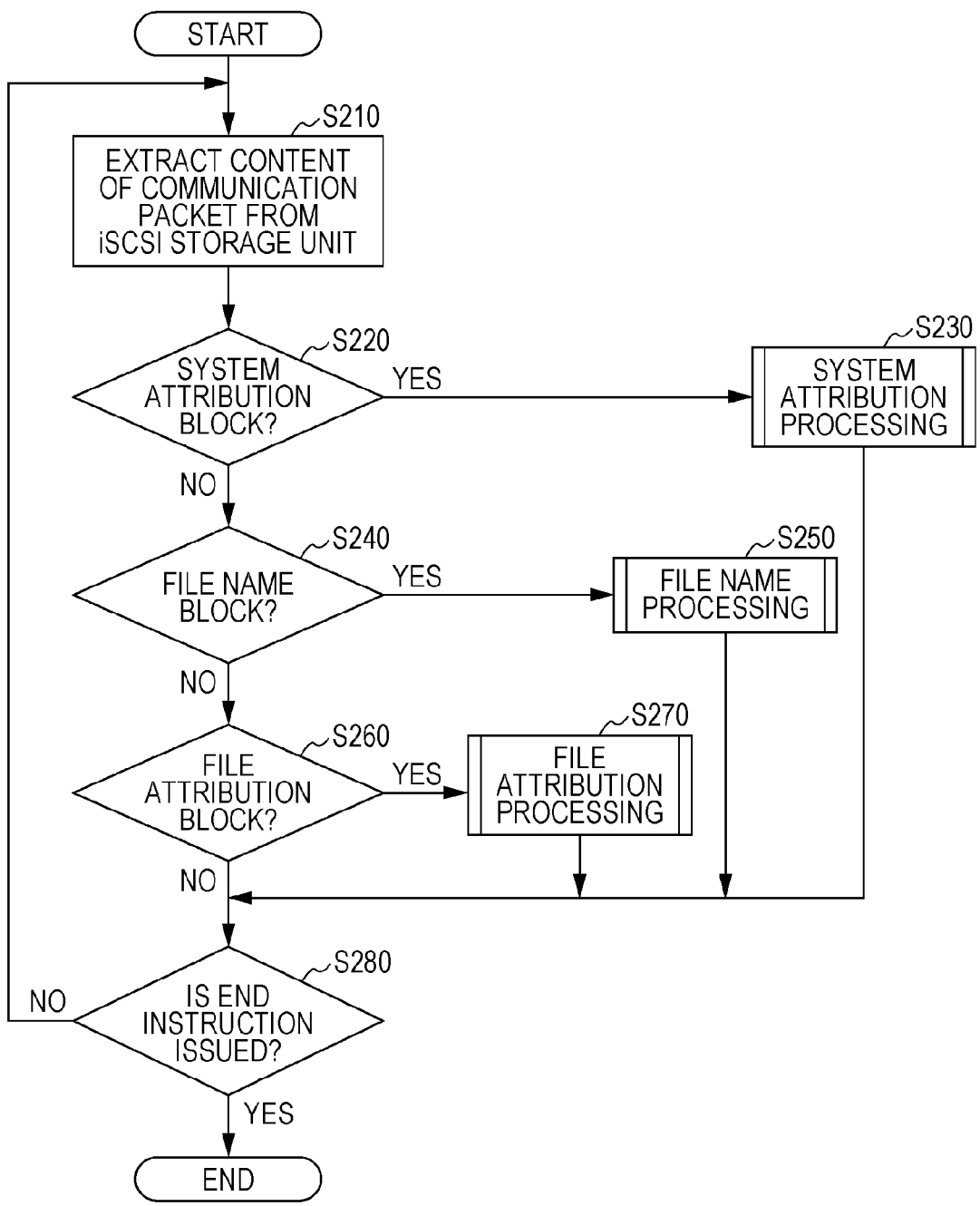
FIG. 7 is a diagram illustrating an example of an operational flowchart for a configuration reproduction unit, according to an embodiment.

FIG. 7 is a diagram illustrating an example of an operational flowchart for the configuration reproduction unit 430, according to an embodiment. The block determination unit 431 extracts one of contents of communication packets from the iSCSI storage unit 420 (step S210). That is, a block and so forth is extracted. The block determination unit 431 determines whether or not the extracted block and so forth are related to a system attribution block (step S220). When the block determination unit 431 determines that the block and so forth are related to a system attribution block (step S220: YES), system attribution processing which will be described later is executed (step S230).

On the other hand, when the block determination unit 431 determines that the block and so forth are not related to a system attribution block (step S220: NO), the block determination unit 431 determines whether or not the block and so forth are related to a file name block (step S240). When the block determination unit 431 determines that the block and so forth are related to a file name block (step S240: YES), file name processing which will be described later is executed (step S250).

On the other hand, when the block determination unit 431 determines that the block and so forth are not related to a file name block (step S240: NO), the block determination unit 431 determines whether or not the block and so forth are related to a file attribution block (step S260). When the block determination unit 431 determines that the block and so forth are related to a file attribution block (step S260: YES), file attribution processing which will be described later is executed (step S270). The block determination unit 431 repeats the processing from step S210 to S270 until an end instruction is issued (step S280). When determination with respect to all of blocks and so forth is completed, an operation of the configuration reproduction unit 430 may be ended.

Figure 8A:
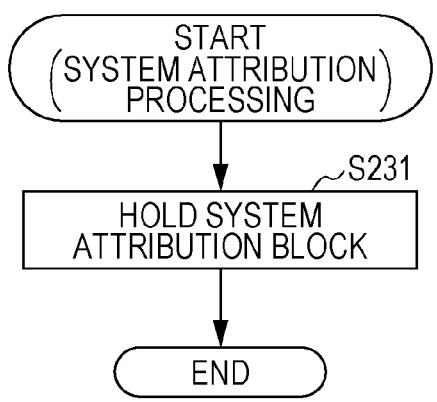
FIG. 8A is a diagram illustrating an example of an operational flowchart for system attribution processing, according to an embodiment.
Figure 8B:
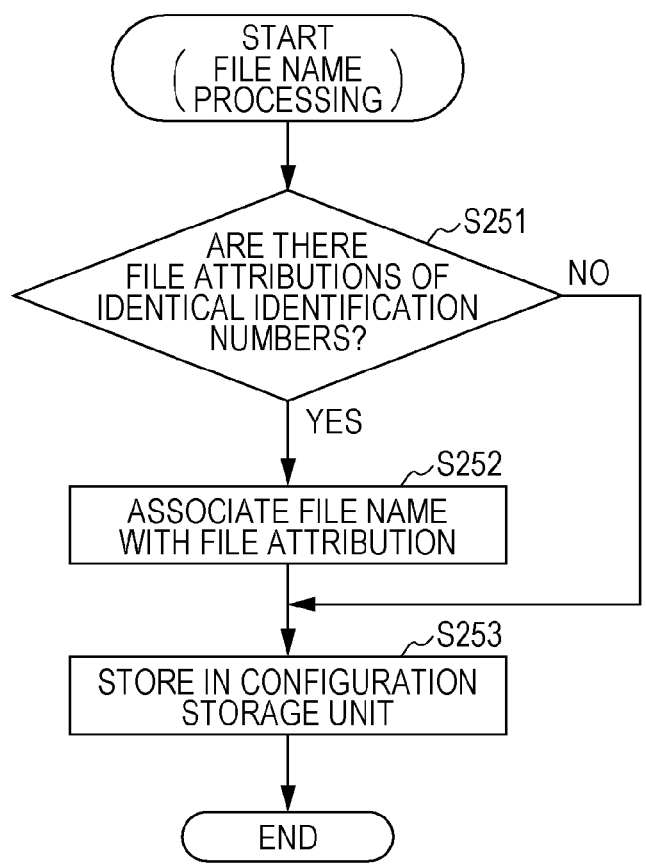
FIG. 8B is a diagram illustrating an example of an operational flowchart for file name processing, according to an embodiment.

The above-mentioned system attribution processing and file name processing are now described in sequence with reference to FIGS. 8A and 8B respectively.

FIG. 8A is a diagram illustrating an example of an operational flowchart for system attribution processing, according to an embodiment. When the block determination unit 431 determines that the block and so forth are related to a system attribution block in the above-described determination processing of step S220, the block determination unit 431 holds the extracted system attribution block as illustrated in FIG. 8A (step S231). More specifically, the block determination unit 431 holds the file system attribution data 311 which is stored in the system attribution block. When the block determination unit 431 has held the file system attribution data 311, the block determination unit 431 ends the processing. The file system attribution data 311 which is held by the block determination unit 431 is used in processing for calculating a storage block number and processing for calculating an identification number which will be described later. Here, the file system attribution data 311 is held in a predetermined table for system attributions. The predetermined table is formed in a storage region of the RAM 400*b*.

FIG. 8B is a diagram illustrating an example of an operational flowchart for file name processing, according to an embodiment. When the block determination unit 431 determines that the block and so forth are related to a file name block in the above-described determination processing of step S240, the block determination unit 431 determines whether or not there are file attributions of identical identification numbers, as illustrated in FIG. 8B (step S251). Here, though details will be provided in step S276, calculated identification numbers are provided to respective pieces of file attribution data 313 stored in the file attribution block, and the pieces of file attribution data 313 provided with the identification numbers are held in a predetermined table for file attributions. The block determination unit 431 determines whether or not there is file attribution data 313 having an identification number which is identical to the identification number provided to each of the pieces of file name data 312 which are stored in the file name block.

When the block determination unit 431 determines that there are file attributions of identical identification numbers (step S251: YES), the first associating unit 434 associates the file name data 312 with the file attribution data 313 (step S252). Subsequently, the first associating unit 434 stores the file name data 312 and the file attribution data 313 which are associated with each other, in the configuration storage unit 440 as configuration data (step S253). Here, when the block determination unit 431 determines that there are no file attributions of identical identification numbers (step S251: NO), the first associating unit 434 directly saves the file name data 312 which is stored in the file name block, in the configuration storage unit 440, by overwriting existing data, without performing the associating processing of step S252 (step S253). The file name data 312 is in a wait state in the configuration storage unit 440 until an identification number with respect to the file attribution data 313 is calculated and associated.

The above-described file attribution processing is now described with reference to FIG. 9 and FIGS. 10A to 10C.

Figure 9:
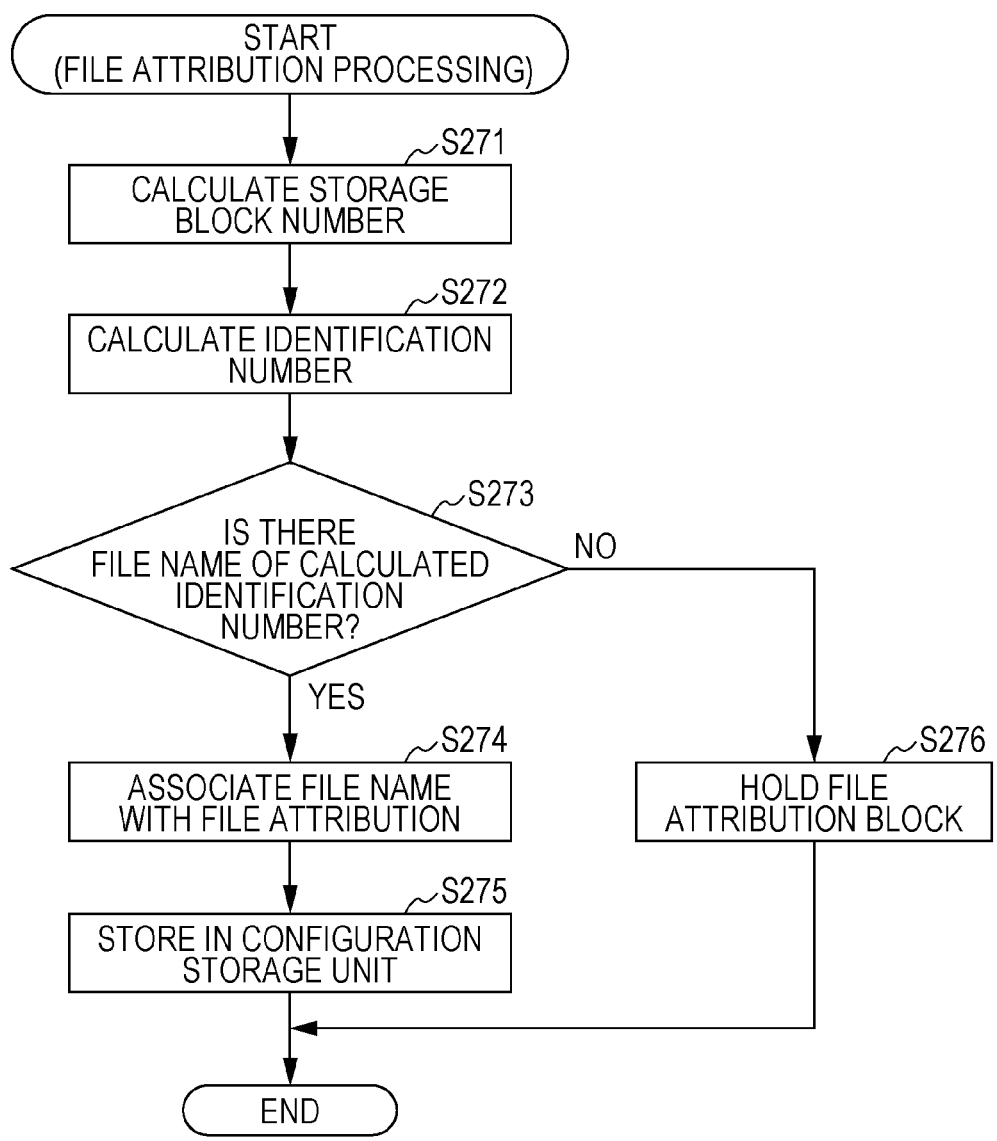
FIG. 9 is a diagram illustrating an example of an operational flowchart for file attribution processing, according to an embodiment.

FIG. 9 is a diagram illustrating an example of an operational flowchart for file attribution processing, according to an embodiment. FIG. 10A is a diagram illustrating an example of block number calculation, according to an embodiment. FIG. 10B is a diagram illustrating an example of identification number calculation, according to an embodiment. FIG. 10C is a diagram illustrating an example of association between the file name data 312 and the file attribution data 313, according to an embodiment.

When the block determination unit 431 determines that the block and so forth are related to a file attribution block in the above-described determination processing of step S260, the block number calculation unit 432 calculates a storage block number, as illustrated in FIG. 9 (step S271). That is, a number of a file attribution block in which plural pieces of file attribution data 313 are stored is calculated. The calculation of a storage block number is performed on the basis of the above-mentioned calculation formula of a block number, the file system attribution data 311 which is held in a predetermined table for system attributions, an address provided to the system attribution data, and an address provided to the file attribution block. As a result, in the case, a block number "33795" with respect to the file attribution block is obtained as illustrated in FIG. 10A.

When the block number calculation unit 432 calculates a storage block number, the identification number calculation unit 433 subsequently calculates an identification number (step S272). The calculation of an identification number is performed on the basis of the above-described calculation formula of an identification number of a head, the calculation formula of the number of attributions/block, the predetermined calculation formula, the calculation formula of an offset up to a head, a storage block number, and the file system attribution data 311. As a result, identification numbers "32769", . . . , and "32801" with respect to plural pieces of file attribution data 313 which are stored in the file attribution block are obtained, as illustrated in FIG. 10B.

Subsequently, the first associating unit 434 determines whether or not there is a file name of the calculated identification number (step S273). As described above, file name data 312 to which the file attribution data 313 has not yet been associated are stored in the configuration storage unit 440. Since identification numbers are provided to the file name data 312, whether or not there is file name data 312 to which an identification number identical to the calculated identification number is provided is determined. When the first associating unit 434 determines that there is a file name of the calculated identification number (step S273: YES), the first associating unit 434 associates the file name data 312 with the file attribution data 313 (step S274). The association is performed on the basis of a comparison between each calculated identification number and each identification number provided to the file name data 312, as illustrated in FIG. 10C. At the same time, association between a directory file and a normal file is also performed. Accordingly, the configuration of a directory file including a normal file as well is reproduced. Subsequently, the first associating unit 434 saves the file name data 312 and the file attribute data 313 which are associated with each other, in the configuration storage unit 440 as configuration data, by overwriting existing data (step S275).

Here, when the first associating unit 434 determines that there is no file name of the calculated identification number (step S273: NO), the first associating unit 434 holds the file attribute block (step S276). That is, plural pieces of file attribute data 313 which are stored in the file attribute block are held. As described above, identification numbers which have already been calculated through the processing of step S272 are provided to respective pieces of file attribute data 313 which are stored in the file attribute block. The pieces of file attribute data 313 provided with the identification numbers are held in a predetermined table for file attributions. The predetermined table is formed in a storage region of the RAM 400b. Then, the file attribute data 313 which is held is used in the determination processing of step S251.

FIG. 11 is a diagram illustrating an example of configuration data which is stored in the configuration storage unit 440, according to an embodiment. As illustrated in FIG. 11, configuration data includes an identification number, a file name, access time, modify time, change time, and a size, as a data format. The identification number is an identification number which is provided to a normal file. The file name is a file name in which a directory file name and a normal file name are structured in a hierarchical manner. The access time, the modify time, the change time, and the size which are elements of the file attribute data 313 are associated with the identification number and the file name which are elements of such file name data 312. Here, the size represents a size of a normal file. According to the embodiment, it is possible to reproduce the configuration of a directory including a normal file as well, such as an access status with respect to a file and a hierarchical structure of directories.

Figure 12:
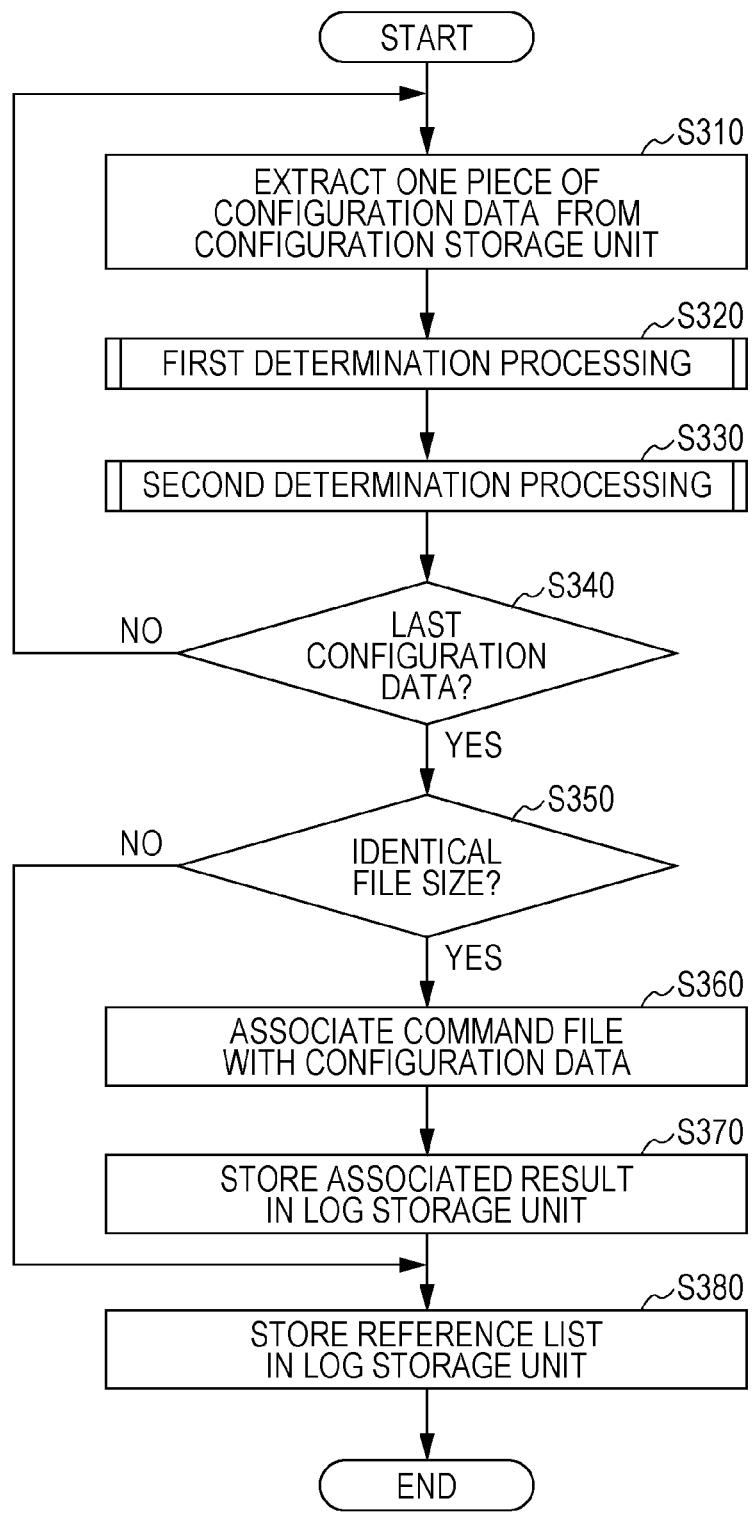
FIG. 12 is a diagram illustrating an example of an operational flowchart for an access estimating unit, according to an embodiment.

FIG. 12 is a diagram illustrating an example of an operational flowchart for the access estimating unit 450, according to an embodiment. The second associating unit 451 extracts one piece of configuration data from the configuration storage unit 440 (step S310). Subsequently, the second associating unit 451 executes first determination processing (step S320) and second determination processing (step S330) which will be described later. When the second determination processing is ended, the second associating unit 451 determines whether or not the extracted configuration data is the last configuration data (step S340). When the second associating unit 451 determines that the extracted configuration data is not the last configuration data (step S340: NO), the second associating unit 451 continuously repeats the processing from step S310 to S330. On the other hand, when the second associating unit 451 determines that the extracted configuration data is the last configuration data (step S340: YES), the second associating unit 451 performs processing from step S350 to S380 which will be described later.

Here, the first determination processing and the second determination processing which are mentioned above are described with reference to FIGS. 13 to 16.

Figure 13:
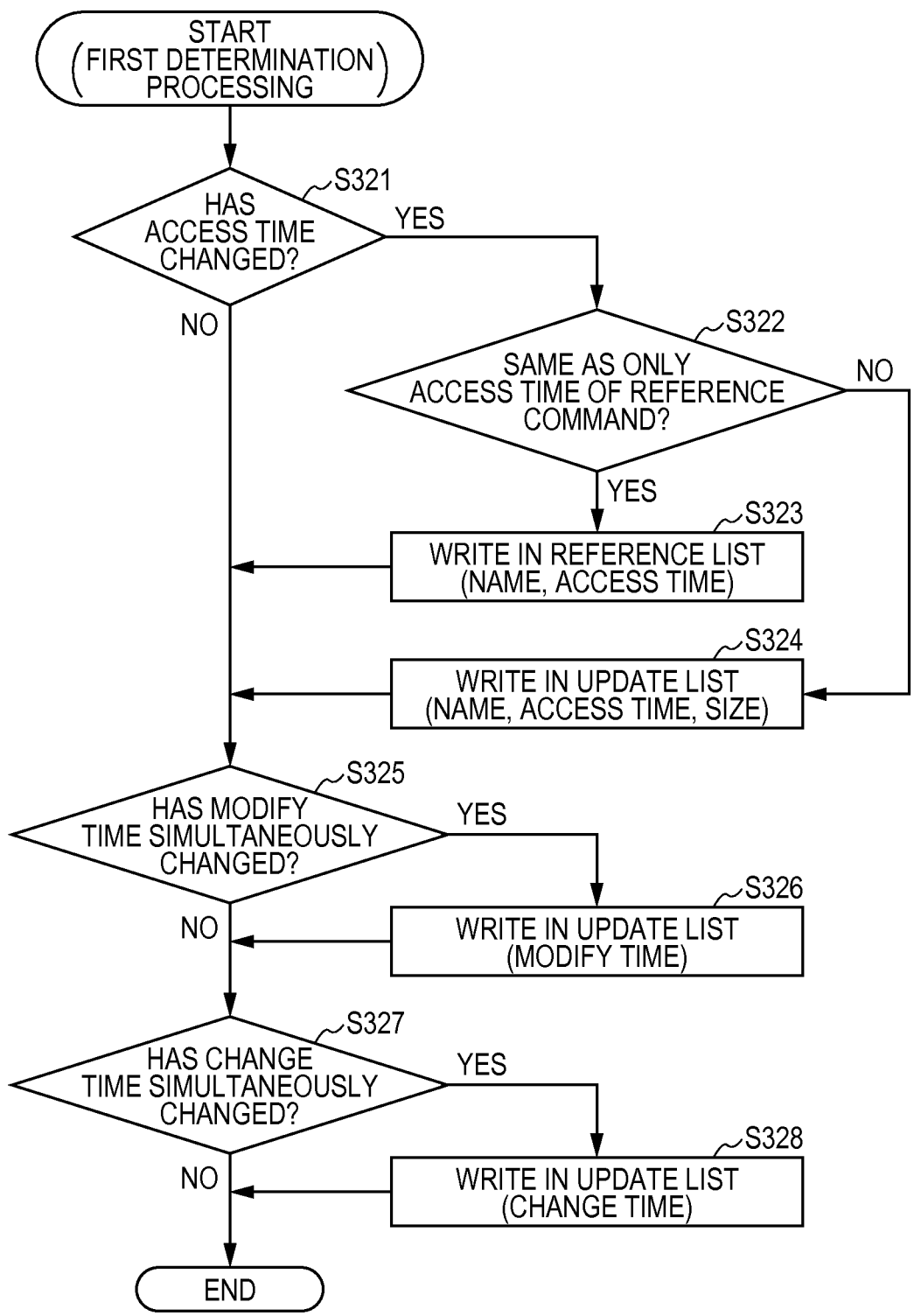
FIG. 13 is a diagram illustrating an example of an operational flowchart for first determination processing, according to an embodiment.
Figure 14:
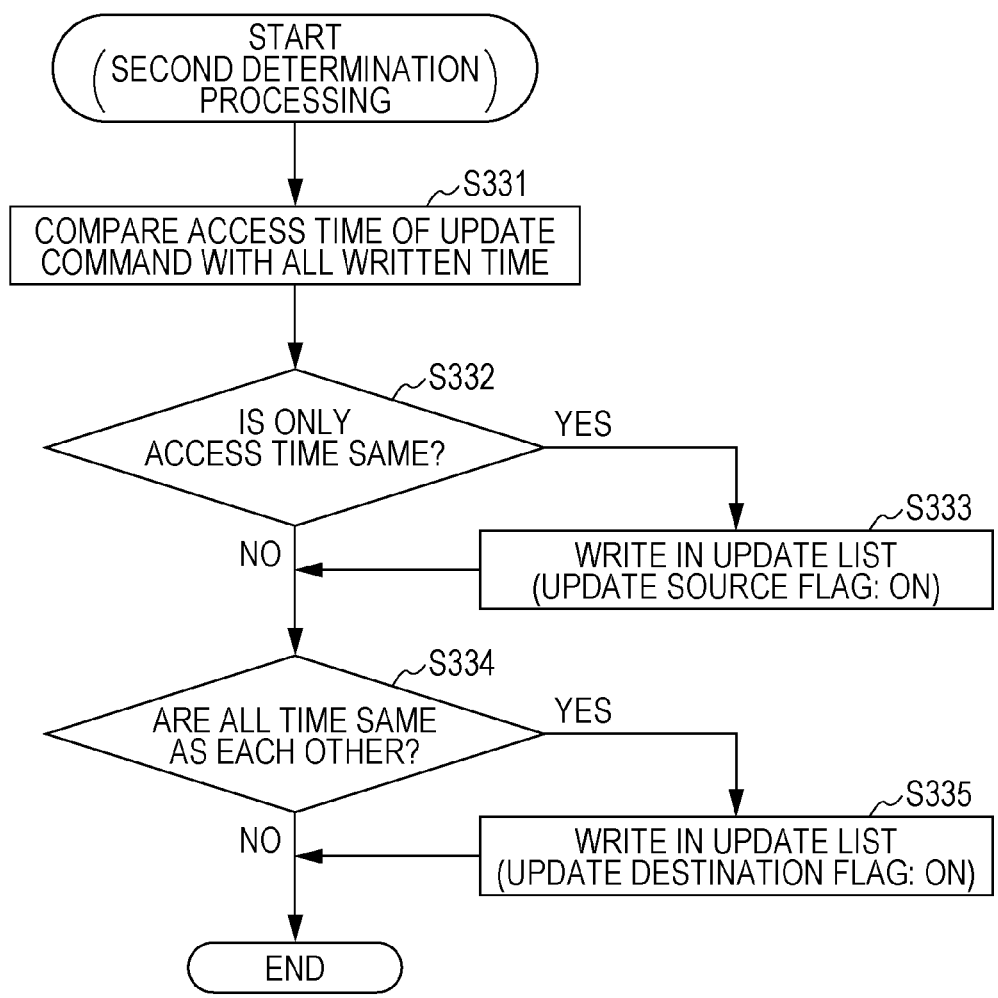
FIG. 14 is a diagram illustrating an example of an operational flowchart for second determination processing, according to an embodiment.

FIG. 13 is a diagram illustrating an example of an operational flowchart for first determination processing, according to an embodiment. FIG. 14 is a diagram illustrating an example of an operational flowchart for second determination processing, according to an embodiment. FIG. 15A illustrates an example of a command file, according to an embodiment. FIG. 15B illustrates an example of a reference list, according to an embodiment. FIG. 15C illustrates an example of an update list, according to an embodiment. FIG. 16 illustrates an example of an access log which is stored in the log storage unit 460, according to an embodiment.

The second associating unit 451 first determines whether or not access time has changed (step S321) as illustrated in FIG. 13. This determination processing is performed by comparing access time of the extracted configuration data with access time of the file attribute data 313 to which an identification number identical to an identification number of the extracted configuration data is provided.

For example, access time of configuration data of which an identification number is "32801" illustrated in FIG. 11 is "********". On the other hand, when a command file for updating (update command) among command files illustrated in FIG. 15A is executed at time "##########" which is later than the time "******", access time is time "##########" as illustrated in FIG. 15A because the command file is accessed. Further, along with the execution of the update command, access time of a file which is an object of the update command is also time "##########". For example, in a case in which an update command is a copy command for copying a file, access time of both of a file which is a copying source and a file generated by copying (a file of a copying destination) is time identical to access time of the copy command. Accordingly, when one of file names of files which are objects of the copy command is "A0001/Z9999", access time of the file name "A0001/Z9999" is access time "##########" of the copy command as illustrated in FIGS. 15A and 15**C.

Further, in a case in which access time of configuration data of which an identification number is "47851" is time "********", for example, when a command file for reference (reference command) among the command files illustrated in FIG. 15A is executed at time "&&&&&&&&&&" which is later than the time "******", access time become equal to time "&&&&&&&&&&" as illustrated in FIG. 15A. Further, along with the execution of the reference command, access time of a file which is an object of the reference command also becomes equal to time "&&&&&&&&&&". Accordingly, when a file name of a file which is an object of the reference command is "T5321/F0505", access time of the file name "T5321/F0505" becomes equal to access time "&&&&&&&&&&" of the reference command as illustrated in FIGS. 15A and 15**B.

In this way, it is determined whether or not access time of the file attribute data 313 has changed from access time of configuration data on the basis of execution of an update command or a reference command.

When the second associating unit 451 determines that access time has changed (step S321: YES), the second associating unit 451 subsequently determines whether or not the access time is the same as only access time of the reference command (step S322). When the second associating unit 451 determines that the access time is the same as only access time of the reference command (step S322: YES), the second associating unit 451 performs writing with respect to a reference list (step S323). That is, when access time of the reference command illustrated in FIG. 15A is the same as only access time after change of the file attribution data 313, it may be determined that the access time has been changed due to the reference command. In this case, a file name and the access time are written in the reference list as illustrated in FIG. 15B.

On the other hand, when the second associating unit 451 determines that the access time is the same as not only access time of the reference command (step S322: NO), the second associating unit 451 performs writing with respect to an update list (step S324). In this case, it is determined that access time has changed due to the update command. Then, a file name, the access time, and a size are written in the update list as illustrated in FIG. 15C.

Subsequently, the second associating unit 451 determines whether or not modify time has simultaneously changed (step S325). In the case of the reference command, even if access time simultaneously changes, modify time does not simultaneously change. Therefore, this determination processing is performed when the update command is executed. Further, even in the case of the update command, modify time does not change in the file attribution data 313 for an update source file. Modify time simultaneously changes in the case of an update destination file. That is, when an update command is a copy command, modify time of a file which is newly generated as a copy simultaneously changes.

Accordingly, when the second associating unit 451 determines that modify time has simultaneously changed (step S325: YES), the second associating unit 451 performs writing with respect to the update list (step S326). On the other hand, when the second associating unit 451 determines that modify time has not simultaneously changed (step S325: NO), the second associating unit 451 skips the processing of step S326. As a result, a file name of which modify time is written and a file name of which modify time is not written coexist as illustrated in FIG. 15C.

The second associating unit 451 subsequently determines whether or not change time has simultaneously changed (step S327). In the case of the reference command, change time does not simultaneously change. Therefore, this determination processing is executed when the update command is executed. Further, even in the case of the update command, change time does not change in the file attribution data 313 for an update source file. Change time simultaneously changes in the case of an update destination file. That is, when an update command is a copy command, change time of a file which is newly generated as a copy simultaneously changes.

Accordingly, when the second associating unit 451 determines that change time has simultaneously changed (step S327: YES), the second associating unit 451 performs writing with respect to the update list (step S328). On the other hand, when the second associating unit 451 determines that change time has not simultaneously changed (step S327: NO), the second associating unit 451 skips the processing of step S326. As a result, a file name of which change time is written and a file name of which change time is not written coexist as well, as illustrated in FIG. 15C.

When the first determination processing illustrated in FIG. 13 is ended, the second associating unit 451 subsequently executes the second determination processing illustrated in FIG. 14.

The second associating unit 451 first compares access time of an update command with all written time as illustrated in FIG. 14 (step S331). That is, the second associating unit 451 compares access time, modify time, and change time which are written in the update list illustrated in FIG. 15C, with access time of the update command.

Here, the second associating unit 451 determines whether or not only access time is the same (step S332). When the second associating unit 451 determines that only access time is the same (step S332: YES), the second associating unit 451 performs writing with respect to the update list (step S333). As mentioned above, a file name of which modify time and change time are not written and a file name of which modify time and change time are written coexist in the update list illustrated in FIG. 15C. When only access time is the same, the access time is accorded with access time of a file name of which modify time and change time are not written. In this case, the file name may be determined as the file name of an update source and ON is written in the update source flag as illustrated in FIG. 15C.

On the other hand, when the second associating unit 451 determines that it is not only access time that is the same (step S332: NO), the second associating unit 451 determines whether or not all time are the same as each other (step S334). When the second associating unit 451 determines that all time are the same as each other (step S334: YES), the second associating unit 451 performs writing with respect to the update list (step S335). When the all time, namely, access time, modify time, and change time are the same as each other, the access time is accorded with access time, modify time, and change time of a file name of which the modify time and the change time are written. In this case, this file name may be determined as the file name of an update destination and ON is written in the update destination flag as illustrated in FIG. 15C. Thus, in the second determination processing, a file name of an update source and a file name of an update destination in an update command are estimated.

Referring back to FIG. 12, the processing from remaining steps S350 to S380 is described.

When the second associating unit 451 determines that the extracted configuration data is the last configuration data in step S340, the second associating unit 451 determines whether or not sizes are identical to each other, as illustrated in FIG. 12 (step S350). This determination is performed on the basis of whether or not file names of which sizes written in the update list, which is illustrated in FIG. 15C, are the same as each other are present. For example, when a copy command is executed and a file size of a copy source file is identical to a file size of a copy destination file, the copy destination file is more likely to be generated from the copy source file. Accordingly, when sizes of files are identical to each other in a state that an update source flag and an update destination flag are written in an update list, it is presumed that a file name of the update source is highly relevant to a file name of the update destination in the update command.

When the second associating unit 451 determines that sizes are identical to each other (step S350: YES), the second associating unit 451 associates a command file with configuration data (step S360). As a result, the update command, file names which are included in the configuration data and are an update source and an update destination, and identification numbers respectively corresponding to the file names are mutually associated. On the other hand, when the second associating unit 451 determines that sizes are not identical to each other (step S350: NO), the second associating unit 451 skips the processing of steps S360 and S370. When sizes of files are not identical to each other, it is presumed that a file name of the update source and a file name of the update destination in the update command are not highly relevant to each other.

The second associating unit 451 subsequently stores the associated result with access time in the log storage unit 460 (step S370). Further, the second associating unit 451 stores the reference list, which is illustrated in FIG. 15B, in the log storage unit 460 with access time and an identification number corresponding to a file name (step S380). As a result, access time, a command name of an executed command file, an identification number corresponding to a file name of an update source or a reference source, and an identification number corresponding to an update destination file name are stored in the log storage unit 460 as an access log, as illustrated in FIG. 16. Thus, it is possible to associate a command file and a file which is an object of the command file.

As described thus far, according to the embodiment, a communication packet which flows in a communication network between the server device 200 and the storage device 300 is acquired and analyzed.

Accordingly, it is possible to promptly grasp input/output of a command file which is executed in the inside of the server device 200 and a file associated with the execution, even without implementing a program for analysis on the server device 200. Especially, analysis is performed on the basis of correlation of file attributes (for example, a time stamp and a file size), so that special monitoring items do not have to be set.

Further, a communication packet to be analyzed is limited to a communication packet which is communicated by a protocol employing the block access. Therefore, analysis efficiency is improved compared to a case of analysis of communication packets including a communication packet which is communicated by using a protocol other than the protocol employing the block access. Further, in a case in which a communication packet is monitored by implementing a program for analysis on the server device 200 or in a case in which a communication packet between the terminal device 100 and the server device 200 is monitored, accuracy in analysis may be degraded when a third person invades the server device 200 and alters a program or a log which is outputted to the inside of the server device 200. However, according to the embodiment of the present disclosure, a communication packet which flows in the communication network between the server device 200 and the storage device 300 is analyzed, thereby avoiding such possibility of degradation.

On the operation side as well, in a case in which there are a plurality of server devices 200 and a program for analysis is implemented on each of the server devices 200, when a patch is applied to each of the server devices 200 due to presence of a bug of the program for analysis, an operation to examine presence of a problem in the server device 200 after the application of the patch has to be performed. However, according to the embodiment of the present disclosure, a communication packet which flows in the communication network between the server device 200 and the storage device 300 is analyzed. Therefore, such an operation does not have to be performed, thereby simplifying maintenance of the server device 200. Further, the embodiments of the present disclosure do not use a resource of the server device 200. Accordingly, there is no influence on an operation system which operates in the server device 200.

The preferable embodiment of the present disclosure has been described thus far. However, embodiments of the present disclosure are not limited to a specified embodiment of the present disclosure but various changes and alterations could be made within the scope of the present disclosure described in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for monitoring communication, the method comprising:
an acquisition process of acquiring a communication packet transmitted according to a protocol employing block access, from a communication network;
a determination process of determining whether the acquired communication packet is related to one of a system attribution block, a file attribution block, and a file name block, the system attribution block storing file system attribution data representing an attribution of a file system, the file attribution block storing plural pieces of file attribution data representing an attribution of a file, the file name block storing plural pieces of file name data representing a file;
a first calculation process of calculating a block number of the file attribution block, based on a first address assigned to the system attribution block and a second address assigned to the file attribution block, when the acquired communication packet is determined to be related to the file attribution block;
a second calculation process of calculating a respective identification number of respective plural pieces of the file attribution data, based on the system attribution data and the calculated block number;
a first association process of respectively associating the respective plural pieces of file attribution data stored in the file attribution block with the plural pieces of file name data stored in the file name block, based on the respective calculated identification numbers and respective identification numbers assigned to the plural pieces of file name data; and
a second association process of associating the file name data with a command file, based on first time stamps of the plural pieces of file name data associated with the plural pieces of file attribution data, and second time stamps of the command file that has caused the file name data to flow into the communication network.

2. The method of claim 1, wherein
the second association process is performed based on file sizes of two files on which an operation of the command file has been performed.

3. The method of claim 1, wherein
the first time stamps includes at least one of a time stamp related to access time, a time stamp related to modify time, and a time stamp related to change time.

4. An apparatus for monitoring communication, the apparatus comprising:
a processor configured to:
acquire a communication packet transmitted according to a protocol employing block access, from a communication network,
determine whether the acquired communication packet is related to one of a system attribution block, a file attribution block, and a file name block, the system attribution block storing file system attribution data representing an attribution of a file system, the file attribution block storing plural pieces of file attribution data representing an attribution of a file, the file name block storing plural pieces of file name data representing a file, calculate a block number of the file attribution block, based on a first address assigned to the system attribution block and a second address assigned to the file attribution block, when the acquired communication packet is determined to be related to the file attribution block calculate a respective identification number of respective plural pieces of the file attribution data, based on the system attribution data and the calculated block number, and associate, respectively, the respective plural pieces of file attribution data stored in the file attribution block with the plural pieces of file name data stored in the file name block, based on the respective calculated identification numbers and respective identification numbers assigned to the plural pieces of file name data; and a memory configured to store the system attribution block, the file attribution block, and the file name block, wherein the processor associates the file name data with a command file, based on first time stamps of the plural pieces of file name data associated with the plural pieces of file attribution data, and second time stamps of the command file that has caused the file name data to flow into the communication network.

5. The apparatus of claim 4, wherein the processor associates the file name data with the command file, based on file sizes of two files on which an operation of the command file has been performed.

6. The apparatus of claim 4, wherein the first time stamps includes at least one of a time stamp related to access time, a time stamp related to modify time, and a time stamp related to change time.

7. A non-transitory computer-readable recording medium storing therein a program for causing a computer to execute a procedure comprising:

an acquisition process of acquiring a communication packet transmitted according to a protocol employing block access, from a communication network;

a determination process of determining whether the acquired communication packet is related to one of a system attribution block, a file attribution block, and a file name block, the system attribution block storing file system attribution data representing an attribution of a file system, the file attribution block storing plural pieces of file attribution data representing an attribution of a file, the file name block storing plural pieces of file name data representing a file;

a first calculation process of calculating a block number of the file attribution block, based on a first address assigned to the system attribution block and a second address assigned to the file attribution block, when the acquired communication packet is determined to be related to the file attribution block;

a second calculation process of calculating a respective identification number of respective plural pieces of the file attribution data, based on the system attribution data and the calculated block number;

a first association process of respectively associating the respective plural pieces of file attribution data stored in the file attribution block with the plural pieces of file name data stored in the file name block, based on the respective calculated identification numbers and respective identification numbers assigned to the plural pieces of file name data; and a second association process of associating the file name data with a command file, based on first time stamps of the plural pieces of file name data associated with the plural pieces of file attribution data, and second time stamps of the command file that has caused the file name data to flow into the communication network.

8. The non-transitory computer-readable recording medium of claim 7, wherein the second association process is performed based on file sizes of two files on which an operation of the command file has been performed.

9. The non-transitory computer-readable recording medium of claim 7, wherein the first time stamps includes at least one of a time stamp related to access time, a time stamp related to modify time, and a time stamp related to change time.

* * * * *